(12) United States Patent　　　　　(10) Patent No.:　US 12,594,512 B2

Pandurangan　　　　　　　　　　　　(45) Date of Patent:　　　Apr. 7, 2026

(54) SHAKER FLUID LEVEL AUTOMATIC CONTROL

(71) Applicant: National Oilwell Varco, L.P., Houston, TX (US)

(72) Inventor: Pradeep S. Pandurangan, Houston, TX (US)

(73) Assignee: National Oilwell Varco, L.P., Houston, TX (US)

( * ) Notice: Subject to any disclaimer, the term of this patent is extended or adjusted under 35 U.S.C. 154(b) by 652 days.

(21) Appl. No.: 17/845,731

(22) Filed: Jun. 21, 2022

(65) Prior Publication Data

US 2023/0405496 A1　　Dec. 21, 2023

(51) Int. Cl.
| | |
|---|---|
| B01D 21/28 | (2006.01) |
| B01D 21/00 | (2006.01) |
| B01D 21/30 | (2006.01) |
| B01D 21/34 | (2006.01) |
| B07B 1/42 | (2006.01) |

(52) U.S. Cl.
CPC ....... B01D 21/283 (2013.01); B01D 21/0012 (2013.01); B01D 21/302 (2013.01); B01D 21/34 (2013.01); B07B 1/42 (2013.01)

(58) Field of Classification Search
CPC .......... B01D 21/283; B01D 21/34; B07B 1/42
See application file for complete search history.

(56) References Cited

U.S. PATENT DOCUMENTS

| | | | |
|---|---|---|---|
| 5,344,570 A | * | 9/1994 | McLachlan .......... B01D 21/302 |
| | | | 210/709 |
| 2006/0243643 A1 | | 11/2006 | Scott et al. |
| 2012/0118798 A1 | | 5/2012 | Scott et al. |
| 2017/0058621 A1 | | 3/2017 | Bailey |
| 2021/0379511 A1 | | 12/2021 | Scott et al. |
| 2023/0122264 A1 | | 4/2023 | Ruel et al. |

OTHER PUBLICATIONS

PCT International Search Report and Written Opinion for corresponding International Application No. PCT/US2023/25738; Dated Nov. 2, 2023; 18 pages.

* cited by examiner

*Primary Examiner* — Bradley R Spies

(74) *Attorney, Agent, or Firm* — Nolte Lackenbach Siegel

(57)　　　　　　ABSTRACT

This disclosure relates to shaker adjustments based on sensor measurements for sensors positioned at different locations about the shaker. This disclosure explains techniques to adjust a shale shaker as would be used to separate particulates (cuttings and other solids) from drilling fluid (commonly referred to as "mud") during a drilling operation. Empirical models have been formulated to provide for programming a controller to calculate run-time adjustments to the shaker to increase efficiency. The controller may control one or more shakers concurrently. Different techniques and measurement types may be used concurrently to achieve desired shaker inclination and maintain a proper beach location during operation. Sensors include accelerometers, proximity sensors, and other types of data acquisition devices that may be used to detect motion parameters of an operational (e.g., in-use and running) shaker.

20 Claims, 13 Drawing Sheets

REPRESENTATIVE INCLINATION ANGLE OF BASKET FROM BACK (FEED) TO FRONT (DISCARD)

UPHILL

LEVEL - HORIZONTAL

DOWNHILL

SHAKER FLUID LEVEL AUTOMATIC CONTROL

BACKGROUND

This section of this document introduces information about and/or from the art that may provide context for or be related to the subject matter described herein and/or claimed below. It provides background information to facilitate a better understanding of the various aspects of the that which is claimed below. This is a discussion of "related" art. That such art is related in no way implies that it is also "prior" art. The related art may or may not be prior art. The discussion in this section of this document is to be read in this light, and not as admissions of prior art.

This disclosure is related to shale shakers that employ vibrating screens to separate fluid from drill cuttings and other sediment within the fluid. When operated, shale shakers are fed with drilling fluid (commonly referred to as "mud") from the wellbore. The mud is intended to be recycled and used again as a lubricant in the drilling process. In order to recycle the mud, the filtering performed by the shale shaker is typically employed.

Fluid (e.g., drilling mud) is fed into the shaker basket at a feed end (referred to herein as the "back" of the shaker). The fluid forms a pool on the inclined shaker screen deck (shakers may have multiple screens to form the screen deck) with the actual inclination of the shaker basket being adjustable as described herein. It is also possible that individual screens from the shaker screen deck may have an inclination offset relative to the overall inclination of the shaker basket.

The shaker basket holds the fluid during the vibration process and allows filtered fluid to pass through the screen level to the floor of the basket while cuttings are maintained above the screen level. The inclination may be uphill (with the front of the shaker basket being higher than the feed end) or may be downhill (with the front of the shaker basket being lower than the feed end). It is also possible for the shaker to be level; however, it is typical for shale shakers to be operated in an uphill inclination.

Vibratory motion of the shaker is responsible, at least in part, for separating the drilling fluid through the screens while the discarded material passes over the screens and exits at a discard end (also called the "front" of the shaker). In operation, it may be advantageous to maintain the fluid end point or "beach" at a certain level on the shaker to extend screen life. The beach is, as its name implies, a point where on one side is fluid and the other side is solid (i.e., sediment or cuttings). It may also be beneficial to evenly distribute the fluid load to multiple shakers to maximize overall system capacity. The actual location of the beach will typically vary during operation as a function of volume of feed versus separation action and discard efficiency.

This disclosure addresses these goals using multiple sensors and a controller receiving inputs from those sensors to provide run-time adjustments during operation of a shale shaker. The run-time adjustments are to adjust feed volume and inclination to alter beach location as well as other operational parameters. Uses other than shale shakers are also within the scope of this disclosure as the concepts described herein may be applicable for shakers that are used for purposes other than recycling drilling mud.

BRIEF DESCRIPTION OF THE DRAWINGS

So that the above recited features and advantages of the present disclosure can be understood in detail, a more particular description of the disclosed improvements, briefly summarized above, may be had by reference to the embodiments thereof that are illustrated in the appended drawings and discussed further below. The included drawings illustrate example embodiments and are, therefore, not to be considered limiting of its scope. The figures are not necessarily to scale and certain features, and certain views of the figures may be shown exaggerated in scale or in schematic in the interest of clarity and conciseness.

While the invention is susceptible to various modifications and alternative forms, the drawings illustrate specific examples herein described in detail by way of example. It should be understood, however, that the description herein of specific examples is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Illustrative embodiments of the subject matter claimed below will now be disclosed. In the interest of clarity, not all features of an actual implementation are described for every example in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1A:
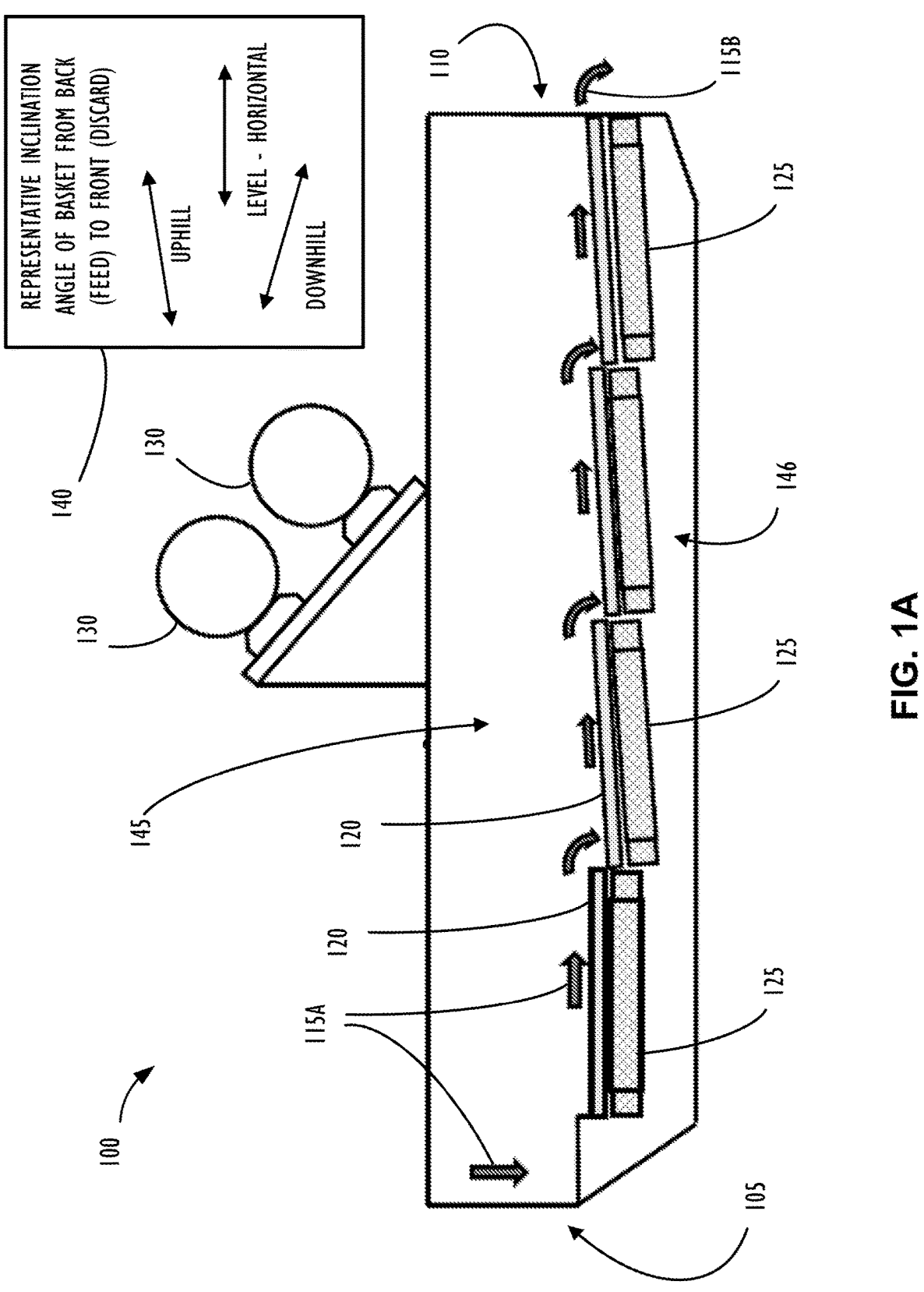
FIG. 1A is a cross-sectional view of a typical shaker for separating liquids and solids in mud used for downhole drilling, this figure is to provide context for other parts of this disclosure.
Figures 1B, 1C:
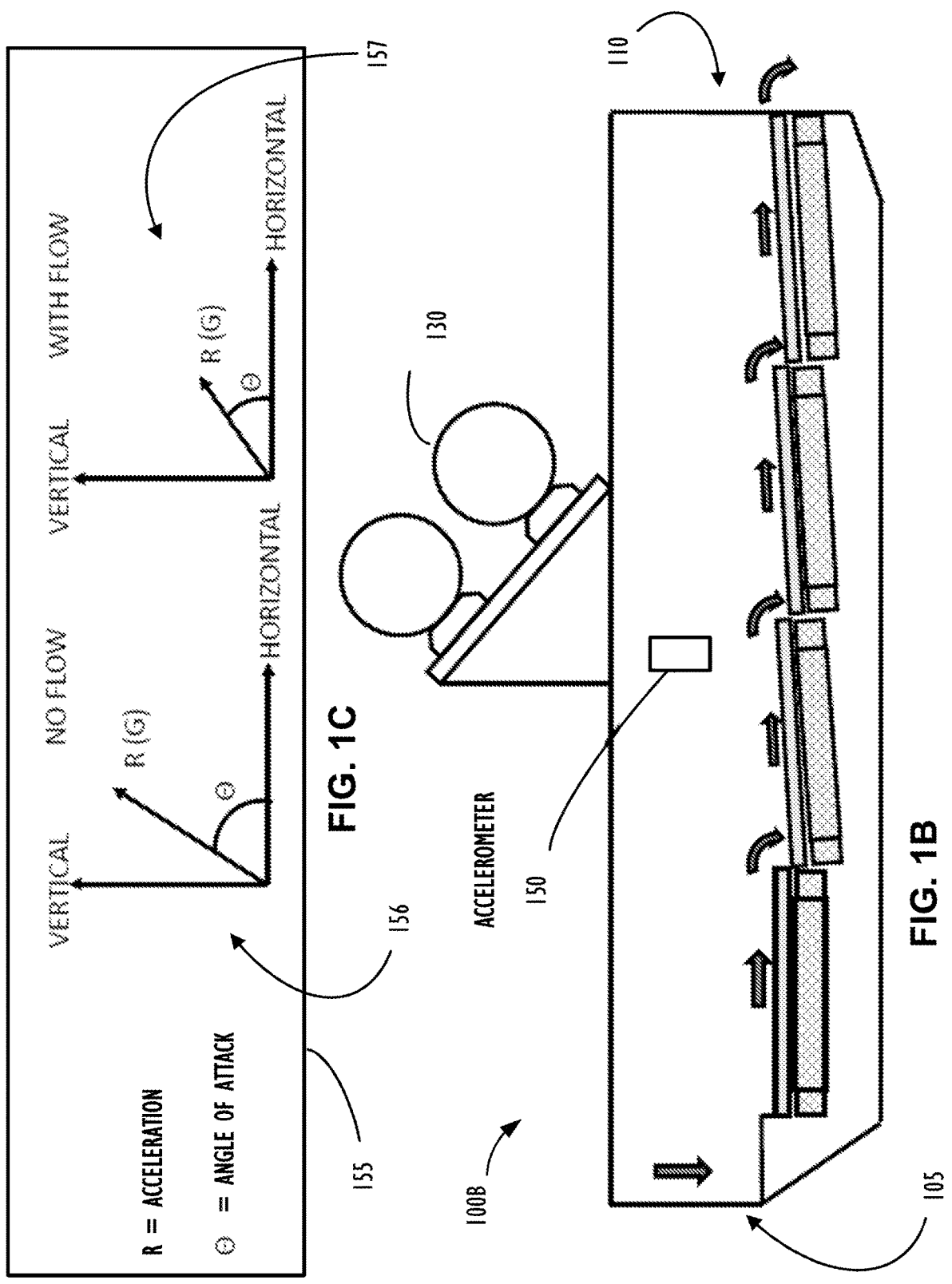
FIG. 1B is a cross-sectional view of a shaker, similar to the shaker of FIG. 1A, that has additional sensor(s) (e.g., accelerometer) to detect, for example, motion parameters of the basket of the shaker, according to an embodiment of the present disclosure.
FIG. 1C illustrates graphs to facilitate the discussion of the shaker of FIG. 1B according to an embodiment of the present disclosure.
Figures 2A, 2B:
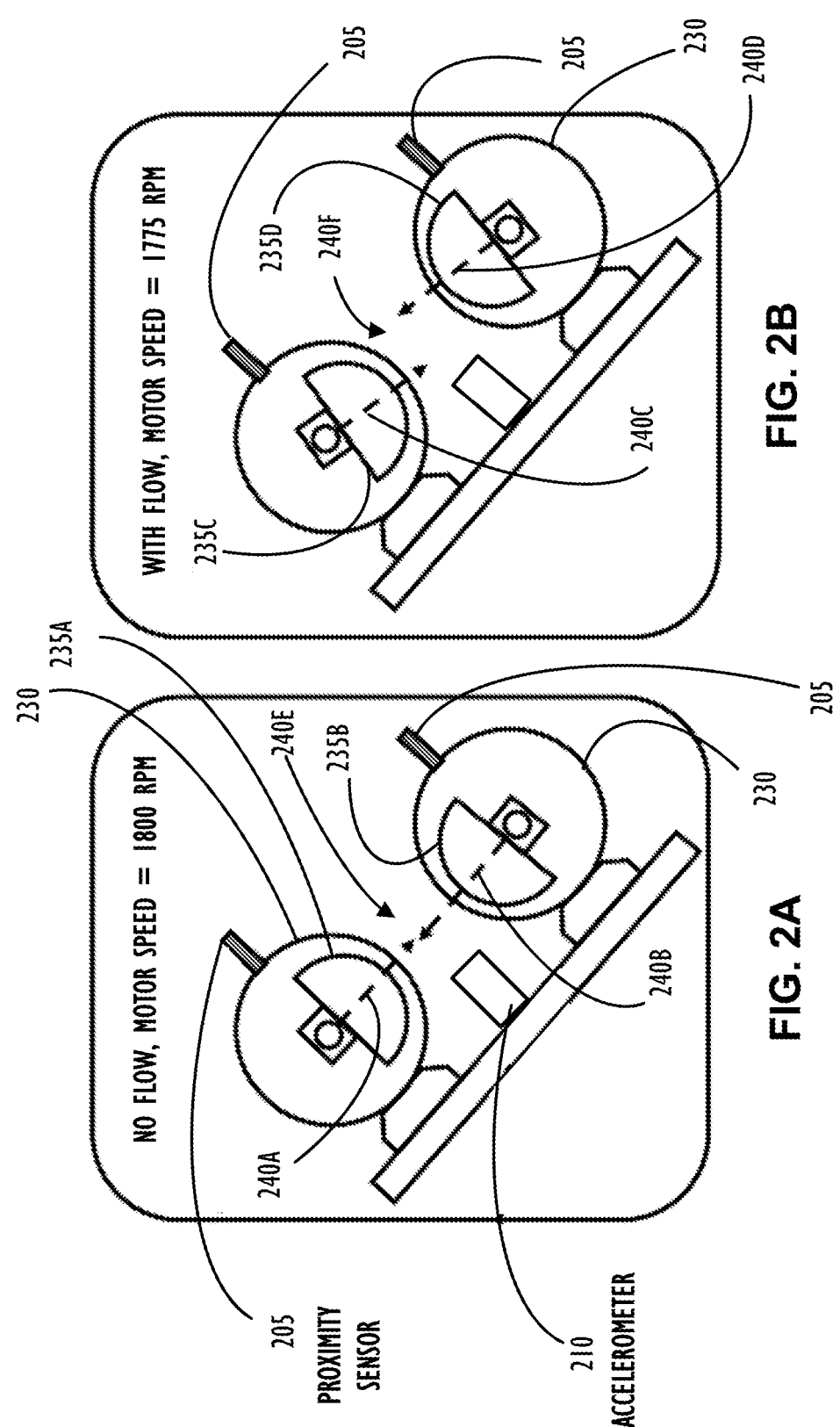
FIG. 2A illustrates aligned motors at a speed of 1800 rotations per minute (RPM) with a proximity sensor on each motor and an accelerometer to use the effects of motor weight orientation and speed according to an embodiment of the present disclosure.
FIG. 2B illustrates mis-aligned motors at a speed of 1775 RPM with a proximity sensor on each motor and an accelerometer to use the effects of motor weight orientation and speed according to an embodiment of the present disclosure.
Figure 3:
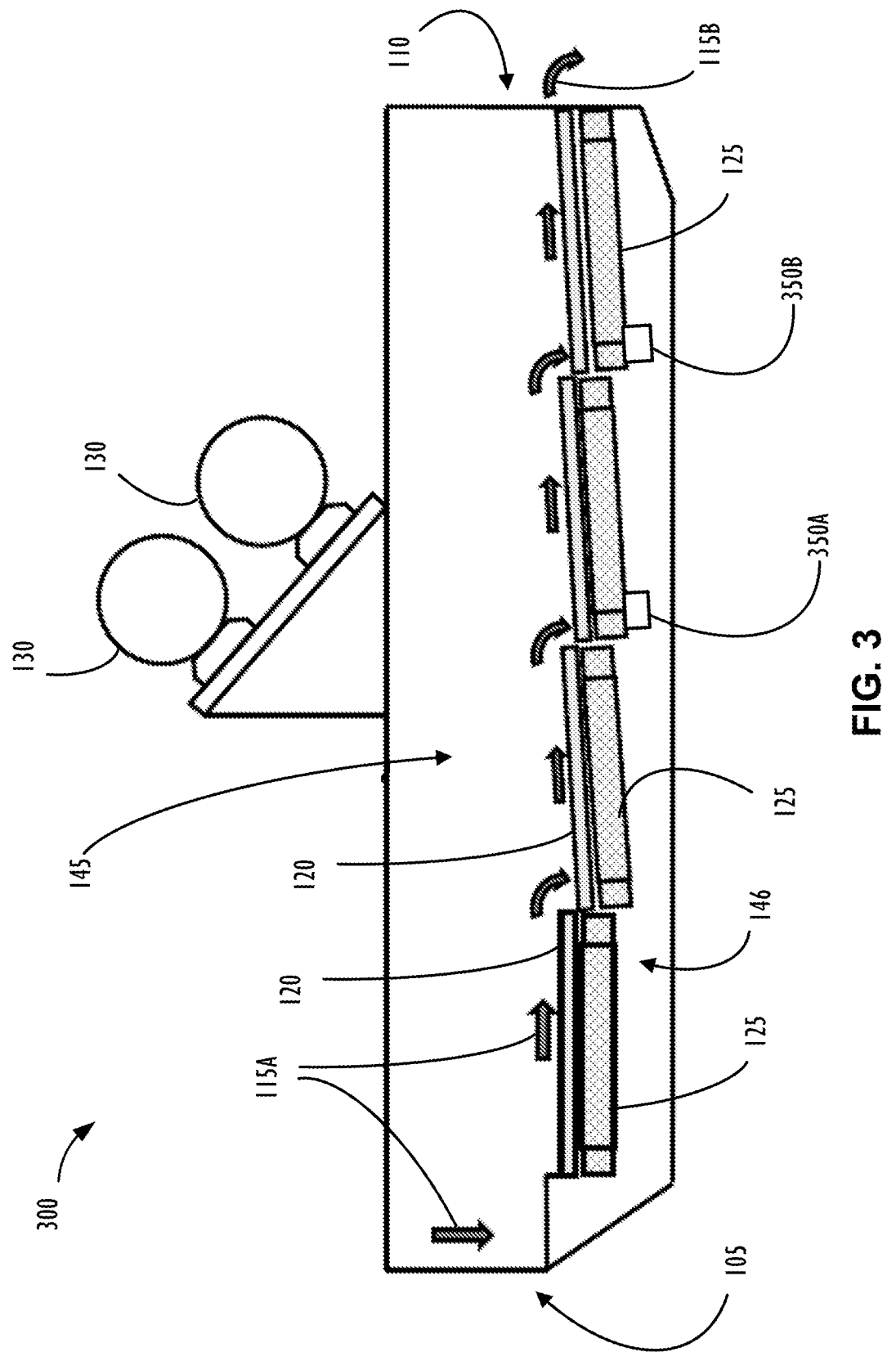
FIG. 3 is a cross-sectional view of a shaker similar to the shaker of FIGS. 1A-B, which has a differently positioned set of sensor(s) (e.g., accelerometers) to detect, for example, high frequency vibration of the screen, according to an embodiment of the present disclosure.

In general, this disclosure relates to sensing the fluid level (and possibly beach location) in a shaker and automatically adjusting the shaker angle and fluid flow to one or a group of shakers responsive to information obtained from one or more sensors positioned about the shaker. This disclosure discusses three measurement techniques that may be used alone or in combination with one another. The three methods may be summarized at a high level as methods that involve measuring:

1) A shaker's overall acceleration and determining its motion profile and inclination as illustrated in FIG. 1B;
2) Vibratory motor weight orientations, motor speed, and shaker acceleration as illustrated in FIGS. 2A-B; and
3) High frequency vibrations on the shaker screen supports or anywhere on the shaker screen structure as illustrated in FIG. 3.

As mentioned, these techniques may be used alone or in any combination but, for the purposes of explanation, are discussed independently in this disclosure.

It has been observed that parameters extracted from the above types of measurements can be correlated to the fluid level in the shaker. Empirical models developed from testing relate the measured parameters to fluid level and an operationally efficient shaker inclination (See FIGS. 5B, 6B-C, and 7B). Control algorithms derived from observed data may be encoded into software for execution by a computer processor (referred to herein as a "shaker controller" or simply controller). Accordingly, the empirical models are developed into software algorithms and deployed in a controller. In operation, the controller can receive feedback from sensors and automatically actuate lifting mechanisms and valves controlling a feed to maintain the fluid level and/or beach location at the desired point within the shaker.

As mentioned above, shale shakers employ vibrating screens to separate fluid from drill cuttings. These shakers are fed with drilling fluid (mud) from the wellbore. The fluid forms a pool on the inclined shaker screen deck. Vibratory motion of the shaker separates the drilling fluid with liquid passing through the screens and the material to be discarded passing over the screens.

Observations have determined that it may be advantageous to maintain the fluid end point or beach at a certain level on the shaker to improve performance and to extend screen life. Specifically, screen life may be extended if all screens are working concurrently rather than having some screens not involved in the separation process (e.g., if no fluid is on the screen furthest from the feed end, that screen will not receive equal wear).

Additionally, it may also be beneficial to evenly distribute the overall fluid load to multiple shakers to maximize overall system capacity. That is, multiple shakers may function in parallel with a control mechanism determining a rate at which to feed each of the multiple shakers.

In general, the embodiments and techniques discussed in this disclosure identify the shaker beach position using various sensors disposed about the shaker. Based on a beach position of an individual shaker, it may be determined if adjustments to that shaker would be suggested to improve performance of that shaker in near real-time. In one example, disclosed control algorithms would automate the process of maintaining the beach at the desired location by modifying the shaker inclination and/or flow of mud from the wellbore (mud to be separated for re-use) to the input feed of the shaker.

In a first example technique (item 1 above), a shaker inclination angle (angle of attack) and maximum acceleration values extracted from an accelerometer are related to the center of gravity and fluid mass in the shaker (FIG. 1B). The same accelerometer can also provide information on the current shaker inclination. These parameters can be used to uniquely identify beach position for various shaker configurations.

In a second example technique (item 2 above) vibratory motor weight orientations with respect to each other may be related (i.e., correlated) to the center of gravity and fluid mass in the shaker (FIG. 2). Motor speed is also related to the fluid mass in the shaker. The motor weight orientations and speed can be measured with one or more proximity sensors (or encoders). An accelerometer mounted on the shaker can further identify motor speed, shaker inclination, and other acceleration related parameters. The accelerometer and proximity sensor measurements can together or separately be used to delineate the current beach position for that shaker.

In a third example technique (item 3 above) fluid interaction with the shaker creates high frequency wave propagations within the shaker structure. These are the result of fluid particles impacting the screen (e.g., splashing of fluid) and subsequent screen to shaker interaction. These high frequency vibrations are generally localized and carry low energy. The high frequency vibrations appear to be most prevalent in the screen support structures and therefore can be captured with a high frequency accelerometer that is located close to the desired beach level. The magnitudes of these high frequency vibrations can be correlated to presence of fluid and thus the beach position (FIG. 3). As will be discussed in more detail below, detection of the high frequency waves may be limited to screens that are located closer to the discard end of the shaker basket because this is the desired area to maintain the beach position.

For each of the above techniques, shaker specific empirical models may be derived from testing and may then be used to relate the measured parameters to the beach position. In some cases, the shaker specific empirical models may be for a certain type or configuration of shaker and then used for similar shakers. For example, a profile of a particular type or configuration of shaker may be derived as a baseline for other shakers. If these other shakers are substantially functionally equivalent to the shaker used for deriving the empirical model, then the substantially functionally equivalent shakers may be considered to be "equally operationally configured." Alternatively, an empirical model may be derived for each individual shaker and maintained for that specific shaker.

In any case, after one or more empirical models is selected for a given shaker, a shaker controller may be programmed with an algorithm that is related to the selected empirical models. The controller may then obtain at run-time specific measurements from various sensors disposed about the shaker. Using sensor information, the controller may provide commands to actuate a shaker inclination adjustment mechanism (e.g., Jackscrew and gear system driven by a stepper motor, airbag or cylinder pressurized with a pneumatic system, etc.) to maintain the beach at the desired position. The controller may also actuate a valve to control the fluid flow into a particular shaker individually or within a group of shakers working collectively.

Motion Parameters

In general, while in use, the primary motion of a shaker occurs along two axes, the vertical (up and down) and horizontal (feed to discard) axes of the shaker. The resultant acceleration is directed at a direction intermediate to these two axes and pointing towards the discard end. The maximum value and angle of that resultant acceleration vector vary as a function of fluid level in the shaker. The parameters of movement along the vertical and horizontal axis can be extracted from a biaxial accelerometer measurement. The same accelerometer can also be used to extract the shaker inclination using the magnitude of gravity measured along its axes.

A controller processor executing instructions derived, in part, using empirical models (FIG. 5B) based on previously obtained measurements can use the parameters obtained from run-time sensors to uniquely indicate the beach point within a shaker. The same models can also be used to determine the shaker inclination that would result in the beach point being set at the desired level. With this understanding, method 500 (FIG. 5) illustrates how a process flow may be deployed in a controller (e.g., programmed into the controller). The controller relies on the method 500 to make a decision to raise or lower the shaker inclination (See lifting mechanism 472 in FIG. 4) and maintain the beach at a desired level in the shaker. When multiple shakers are collectively in use, information derived from run-time sensors on individual shakers along with method 500 may be used to control the flow to one or multiple shakers by actuating input valves (See flow valve 474 in FIG. 4).

Motor Weight Orientation and Speed

In a typical motor (e.g., one not used for a shaker) the motor is balanced to prevent vibration. However, in general, vibratory motors used on shakers have weights attached to shafts of each motor. Accordingly, the shaft center of gravity may intentionally be offset from the shaft centerline. As a result, when the motor shaft rotates these weights create a centrifugal force that is transferred to the shaker.

Further, when in use, the weights from two or more motors that are positioned near each other will tend to orient themselves in an equilibrium position during operation. This motor weight orientation is dependent on several factors including the geometrical positioning of the motors and the center of gravity of the shaker. Further, the center of gravity of a particular shaker is affected by the fluid mass and its level in the shaker. Thus, fluid level in the shaker will accordingly affect the motor weight orientation by changing the shaker center of gravity.

It has been determined that motor weight orientation changes can be quantified as a phase or angular shift. Furthermore, it has been observed that the motor speed is also affected by the fluid mass level in the shaker. To leverage these observations, proximity sensors or encoders measuring weight or shaft orientation may therefore be used to assess the degree of motor weight phase shift (FIG. 2A) and speed changes (FIG. 2B).

Figure 6A:
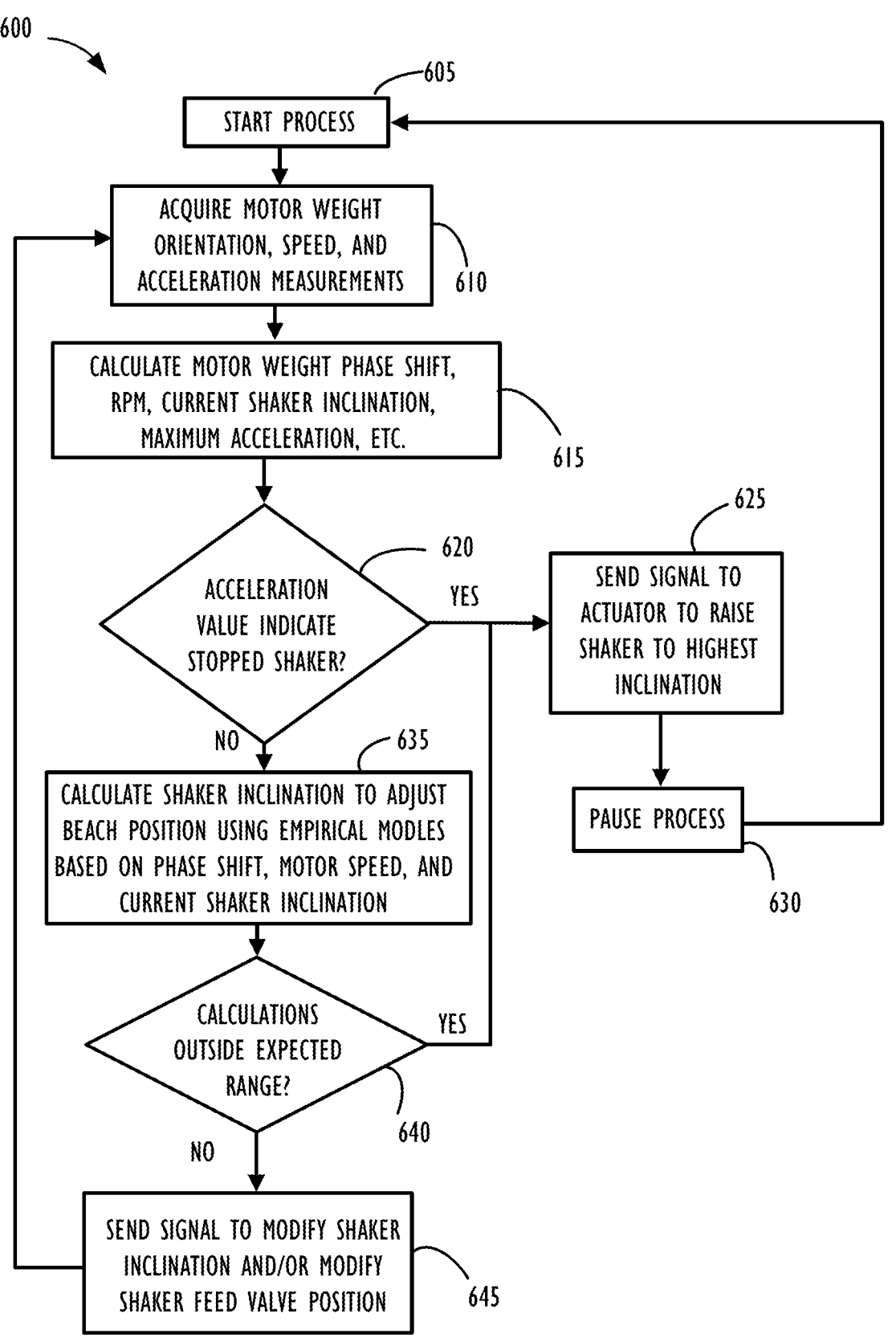
FIG. 6A is an example flow chart to use automatic control for fluid level using, for example, motor weight orientation and motor speed (FIGS. 2A-b) for the shakers illustrated in FIG. 4 according to an embodiment of the present disclosure.
Figure 6B:
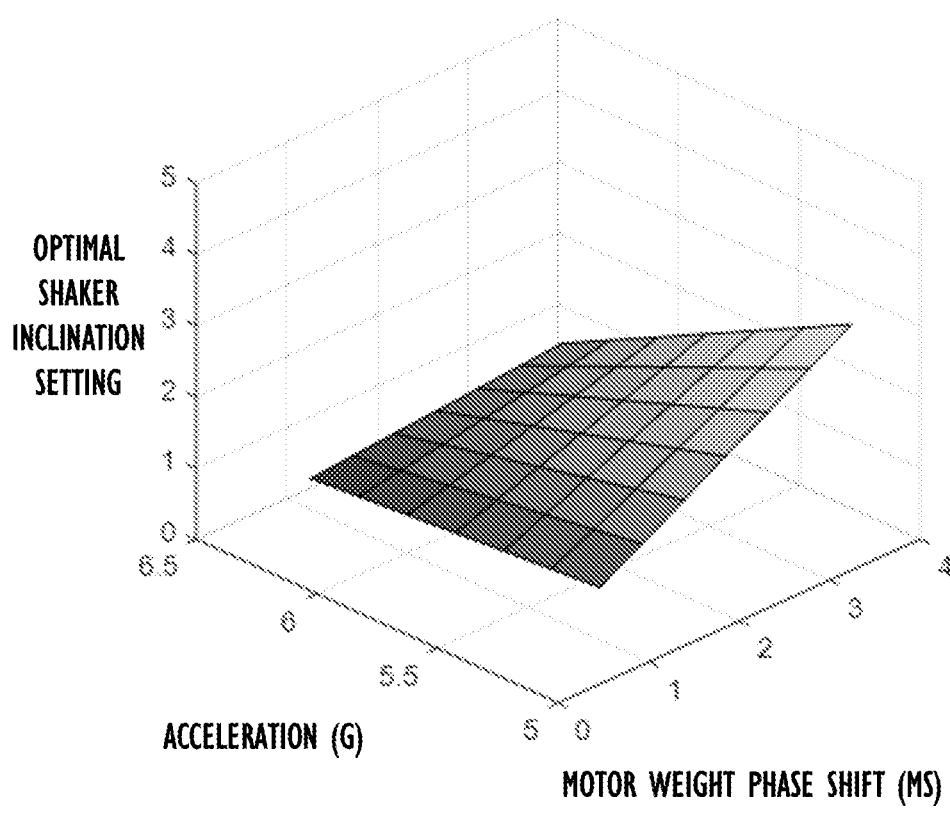
FIG. 6B is an example of a first empirical model based on the embodiment associated with the flow chart of FIG. 6A according to an embodiment of the present disclosure.
Figure 6C:
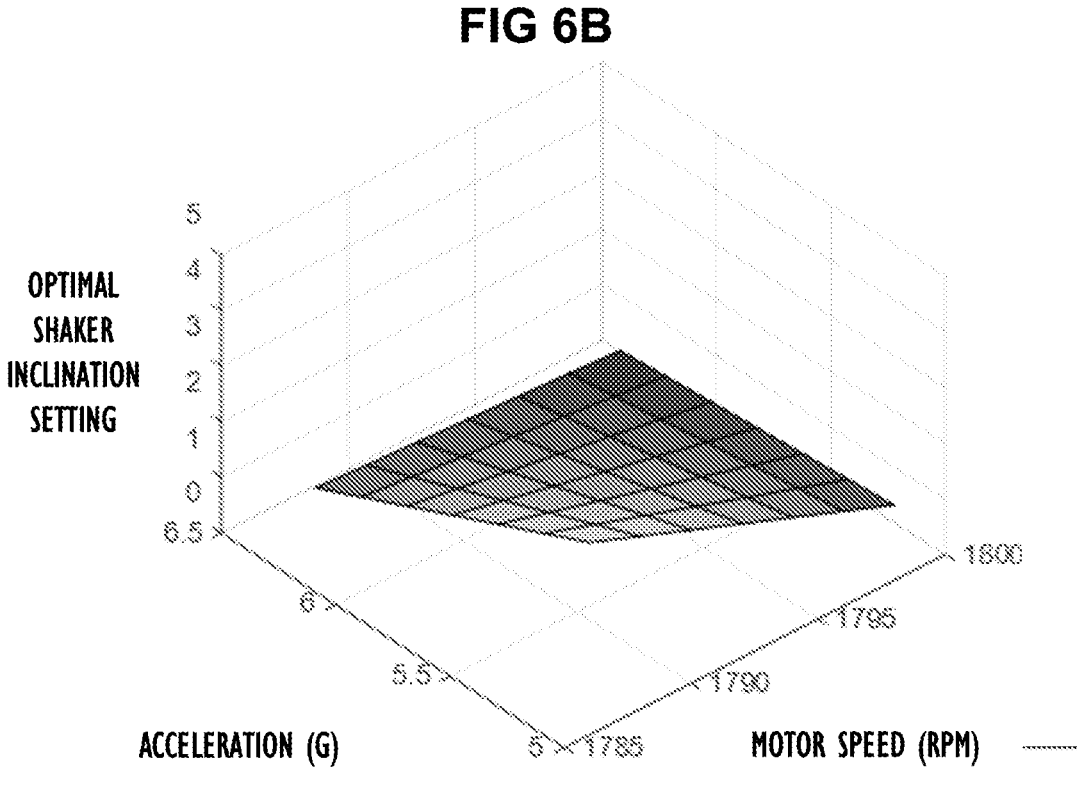
FIG. 6C is an example of a second empirical model based on the embodiment associated with the flow chart of FIG. 6A according to an embodiment of the present disclosure.

Also, as discussed above, accelerometers may be used to concurrently measure current shaker inclination and other parameters such as maximum acceleration and shaker inclination angle. The motor speed can also be indirectly deduced from the dominant frequency in the acceleration measurements. The proximity sensors and accelerometer of this embodiment may send run-time measurements to a controller that is programmed based on empirical models developed from testing. Specifically, these empirical models may be used to create a method of operation using the relation of degree of weight phase shift, motor speed, maximum acceleration, shaker inclination angle, and shaker inclination to the fluid level in the shaker (FIGS. 6A-6C).

The same models can also be used to determine the shaker inclination that would result in the beach point being set at the desired level. The controller, in this example, may utilize a method such as method 600 (FIG. 6) to make a determination to raise or lower the shaker inclination (See lifting mechanism 472 in FIG. 4) to maintain the beach at the desired level in the shaker. When multiple shakers are collectively in use, information derived from run-time sensors on individual shakers along with method 600 may be used to control the flow to one or multiple shakers by actuating input valves (See flow valve 474 in FIG. 4).

High Frequency Vibration

Fluid that is fed to the shaker (mud) typically contains heavy solids and drill cuttings (e.g., the portions that are to be filtered out prior to recycling the mud). As the fluid flow progresses over the shaker screen deck from the feed end to the discard end the fluid particles are projected up due to the vibratory motion of the shaker. It has been observed that when the fluid particles fall back on to the shaker screen the impact created results in high frequency vibrations on the screen and supporting structures. Thus, liquid splashing on a shaker screen imparts a different and measurable impact than does the liquid-cutting-solid mixture.

Figure 7A:
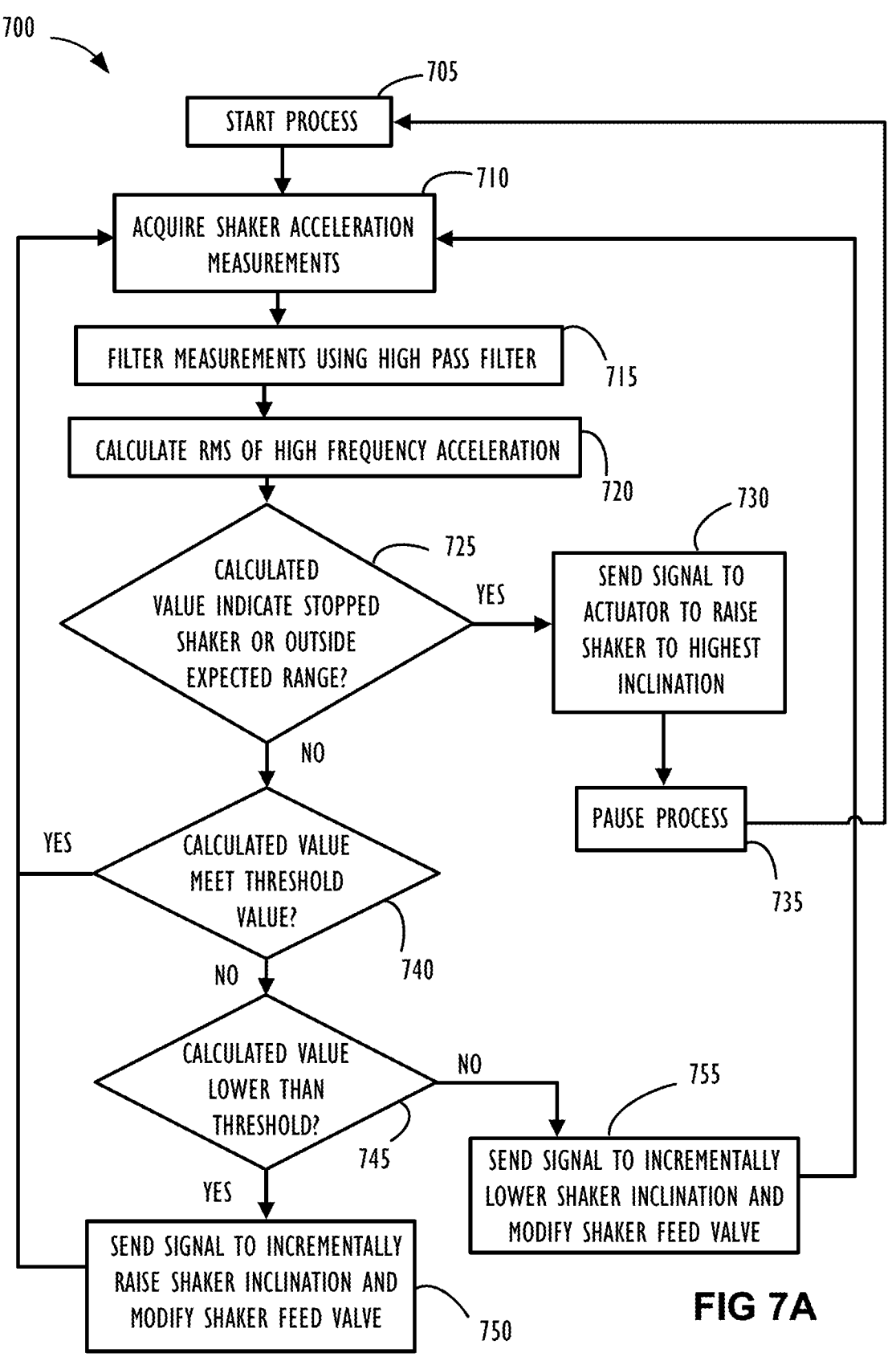
FIG. 7A is an example flow chart to use automatic control for fluid level using, for example, high frequency vibrations related to fluid levels for the shakers illustrated in FIGS. 3-4 according to an embodiment of the present disclosure.
Figure 7B:
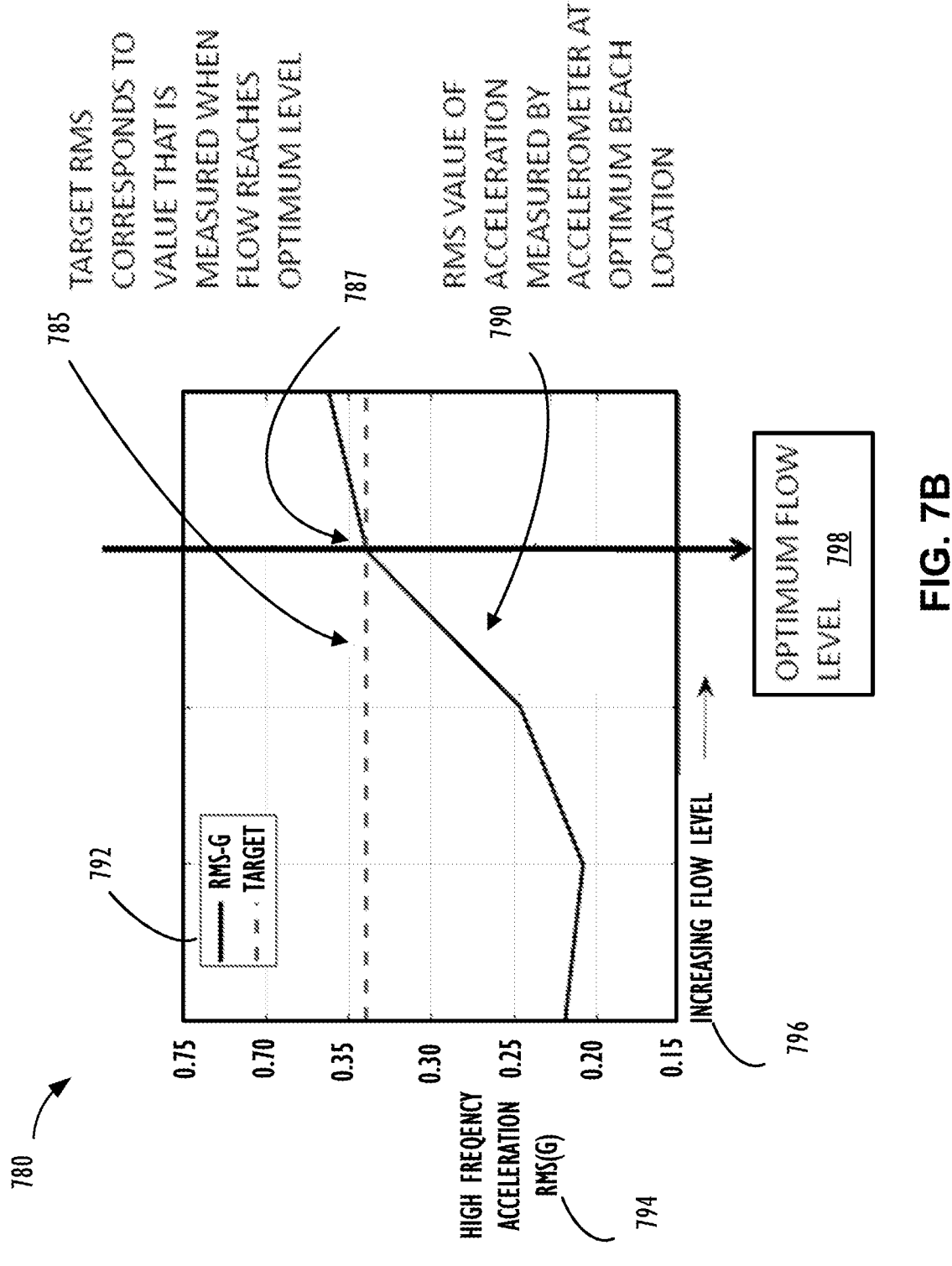
FIG. 7B is an example of target acceleration parameters, for the method regarding using high frequency vibrations related to flow levels (FIG. 7A), to achieve a desired "optimum" flow level according to an embodiment of the present disclosure.

These high frequency vibrations are present only when there is fluid to screen interaction (See FIG. 7B). These vibrations can be captured with a high frequency accelerometer (See 350A and 350B of FIG. 3) positioned on the screen structure. For example, this sensor may be positioned adjacent one or more screens located near the discard end of the shaker basket (i.e., that is where the beach will be desired to be maintained). Measurements obtained by these sensors may be provided to a controller.

Once obtained, the controller may filter the signal provided by the sensors to remove the low frequency components. These low frequency components are related to shaker motion and not fluid to screen interaction. The controller can then compute parameters such as root mean square (RMS), power spectral density (PSD) or number of peaks in the signal. Threshold values for the computed acceleration related parameters that were previously determined from empirical models may then be used to determine if fluid flow is present the immediate vicinity of the accelerometer. The computed acceleration parameter reaches a target value only when flow and therefore beach has reached a particular location.

In this example, the controller is programmed to implement method 700 (FIG. 7A) that compares the computed acceleration parameter value to the target value. The controller, in this example, utilizes calculated information to make a decision to raise or lower the shaker inclination (See lifting mechanism 472 in FIG. 4) to maintain flow and beach at the desired level in the shaker. When multiple shakers are collectively in use, information derived from run-time sensors on individual shakers along with method 700 may be used to control the flow to one or multiple shakers by actuating input valves (See flow valve 474 in FIG. 4).

With an understanding of the above overview, we turn to the figures to describe example implementations in accordance with the above techniques to determine beach level and fluid flow for a shaker (or set of shakers). Again, to be clear, these techniques are discussed individually, however, a person of ordinary skill in the art, given this disclosure, would understand that any combination of disclosed techniques may be used concurrently.

Referring now to FIG. 1A, a cross-sectional view of a typical shaker 100 is illustrated. As explained herein, shaker 100 may be used for separating liquids and solids. In particular, shaker 100 may be a shale shaker that is used to separate liquids and solids in mud that is used as a fluid for downhole drilling. FIG. 1A is utilized in this disclosure to provide a baseline and allow for introduction of terminology such that other embodiments may be discussed relative to this baseline. As stated above, although shale shaker 100, in this example, represents a shale shaker, other types of shakers are within the scope of this disclosure and may benefit from one or more of the techniques disclosed herein.

As illustrated shaker 100 has a back 105 which is a feed end where used mud (i.e., drilling fluid with cuttings and other debris) may be provided into shaker 100. Arrows 115A and 115B illustrate a direction of flow for material when shaker 100 is in use. Shaker 100 also has a front 110 which is a discard end where material to be discarded (and maintained above the filtering components discussed below) may exit shaker 100. Accordingly, material processed by shaker 100 will proceed from arrow 115A at front 105 toward arrow 115B for discard. Shaker 100 also includes two motors 130 to provide vibratory motion when in use.

Internal to shaker 100 there is an upper basket portion 145 and a lower basket portion 146. Upper basket portion 145 represents an area that is above shaker screen level and where material to be discarded is maintained. In contrast, lower basket portion 146 represents an area that is below shaker screen level and liquids will have passed through one of screen support structures 125 (and have been filtered) to reach lower basket portion 146. This filtered liquid is what will be recycled to the drilling process. As illustrated in FIG. 1A, the shaker screen level is provided by a shaker screen structure that includes a screen 120 positioned above the screen support structure 125.

Finally, block 140 illustrates a representative angle of inclination for shaker 100 (and its corresponding basket)

with respect to the angle from back 105 to front 110. As illustrated when front 110 is higher than back 105, the shaker is said to be in an uphill inclination. This uphill inclination is a typical inclination for shaker 100 when used as a shale shaker for drilling mud. Also, when the angle from back 105 to front 110 is horizontal the inclination of the shaker is neither uphill nor downhill and may be considered level. Finally, when front 110 is lower than back 105, the shaker is said to be in a downhill inclination.

Referring to FIG. 1B and FIG. 1C. FIG. 1B is a cross-sectional view of a shaker 100B, similar to shaker 100 of FIG. 1A. However, note that shaker 100B has additional sensor(s) (e.g., accelerometer 150) to detect, for example, motion parameters of the basket of shaker 100B. FIG. 1C illustrates, in box 155, a pair of graphs to show a no flow condition 156 and a flow condition 157 for shaker 100B. In this example, the acceleration measurements as provided by accelerometer 150 indicate that adjustments of the shaker inclination angle may be desired to optimize flow of fluid within shaker 100B.

As explained above, adjustments of the shaker inclination angle may be implemented by using a controller to provide adjustment commands to actuators (e.g., lift mechanisms) associated (but not shown) with shaker 100B. See, for example, FIG. 4 and its further discussion below.

Referring now to FIGS. 2A and 2B, FIG. 2A illustrates aligned motors 230 (each with a respective motor weight) (see alignment indication 240E) at a speed of 1800 rotations per minute (RPM) with a pair of proximity sensors 205 and an accelerometer 210 to use motor weight orientation according to an embodiment of the present disclosure. FIG. 2B illustrates mis-aligned motors 230 (alignment based on motor weights of the motors—see alignment indication 240F) at a speed of 1775 RPM with a pair of proximity sensors 205 and an accelerometer 210 to use motor weight orientation according to an embodiment of the present disclosure. To be clear, there are two motors 230 in each of FIGS. 2A and 2B that have a respective orientation to each other as shown by 1) orientation line 240A which is substantially in alignment with orientation line 240B (as shown by their close alignment at 240E); and 2) orientation line 240C which is not in alignment with orientation line 240D (as shown by their separation at 240F).

As explained briefly above, these alignments are respectively affected by motor weight 235A (associated with orientation line 240A); motor weight 235B (associated with orientation line 240B); motor weight 235C (associated with orientation line 240C); and motor weight 235D (associated with orientation line 240D). In this example, an individual one of proximity sensors 205 is associated with a respective motor and an individual accelerometer 210 is positioned between a corresponding pair of motors 230, in alternate implementations, the accelerometer 210 can also be positioned at other locations on the shaker. Referring back to FIG. 1B it can be seen that the overall orientation of respective pairs of motors 230 is affected by an orientation of a shale shaker (e.g., 100B) to which the pair of motors is attached. Further, in this example, it is the associated pair of motors 230 that provides the vibratory action to the shale shaker as discussed above.

FIG. 2A illustrates a "no flow" condition where motor weights (235A and 235B) for a respective pair of motors 230 are aligned with a motor speed of 1800 rotations per minute (RPM). In contrast, FIG. 2B illustrates a "with flow" condition where motor weights (235C and 235D) for that respective pair of motors 230 are mis-aligned with a reduced speed of 1775 rotations per minute (RPM). The motor speed information can be deduced from either the proximity sensors 205 or accelerometer 210. The accelerometer 210 may be used to concurrently measure current shaker inclination. See also flow chart 600 in FIG. 6A and empirical models of FIGS. 6B and 6C that are discussed below.

FIG. 3 is a cross-sectional view of a shaker 300 similar to the shaker of FIGS. 1A-B, which has a set of sensor(s) (e.g., accelerometers 350A and 350B) at different locations than those of FIG. 1B. The illustrated positioning may be helpful to detect, for example, high frequency vibration of the screen 120 or screen support structure 125 (e.g., a supporting grid structure), according to an embodiment of the present disclosure. As illustrated, the positioning of accelerometer 350A is on the third of four screen support structures 125 within shaker 300 (i.e., first screen support structure 125 is near the back 105 of shaker 300 and fourth screen support structure 125 is near the front 110 of shaker 300).

In this example, it should be noted that each individual screen support structure 125 from the set of screen support structures (in this case four) shown in shaker 300 may have a slightly different orientation with respect to each other. Further, although in some implementations, there may be an accelerometer sensor (such as 350A) on every screen structure within a shaker (such as shaker 300), this may not be as cost effective as the example of shaker 300. This is, in part, because the sensors on a screen support structure 125 that is near the beginning of the series of screen support structures 125 (i.e., those near the back 105) may not provide useful information. As explained above, a desired operational parameter is to maintain the beach (which is the point where these high frequency vibrations are to occur) toward the discard end or front 110 of shaker 300. Accordingly, it may be desirable to only position these "high frequency detector accelerometers" such as accelerometer 350A and 350B on selected screen structures.

Figure 4:
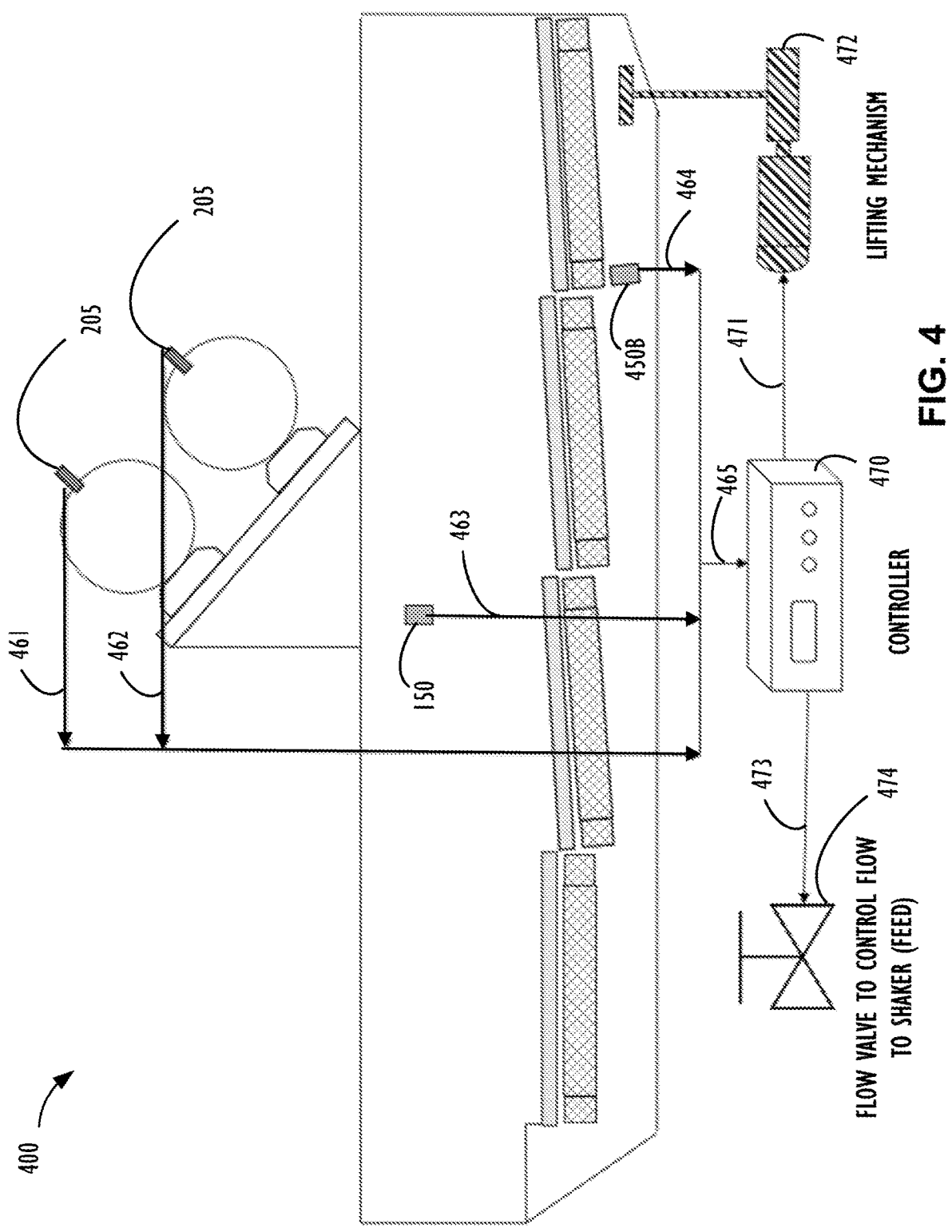
FIG. 4 is a cross-sectional view of a shaker, which includes elements from the shakers of 1A-B, and 3, wherein the view illustrates a possible data communication path from sensors to a control mechanism (e.g., flow-control, controller computer processor, actuator lifting mechanism) according to an embodiment of the present disclosure.

FIG. 4 is a cross-sectional view of a shaker 400. In this example shaker 400 includes elements from the shakers of FIGS. 1A-B, and 3. In addition, shaker 400 further illustrates a possible set of data communication paths (e.g., 461-465, 471, and 473) from sensors (e.g., 205, 150, and 450B) to a control mechanism (e.g., flow-control valve 474, controller computer processor 470, and actuator lifting mechanism 472) according to an embodiment of the present disclosure.

In shaker 400, accelerometer 450B is an example of the high frequency detector accelerometer that was discussed above for shaker 300 (e.g., similar to accelerometers 350A and 350B). In this example, only a single instance of this type of sensor is implemented and it is positioned on the screen structure furthest from the front and closest to the discard end of shaker 400. The rationale for this positioning was explained above.

In operation, each of the sensors may provide information to a control mechanism to effect adjustments to shaker 400. Specifically, sensors 205 for the motors at the top of shaker 400 may respectively communicate to controller 470 using data paths 461 and 462. Sensor 150 may similarly communication via data path 463. Sensor 450B may communicate via data path 464. Each of these individual communication paths may be separate or may be provided via a data bus as illustrated by data path 465.

Once data has arrived at controller 470, the information provided by the sensor measurements may be processed by one or more methods and flows as discussed herein to cause the processor of controller 470 to initiate commands to one of lifting mechanism 472 or flow valve 474 (or both). As illustrated, controller 470 may communicate with flow valve 474 via data path 473. Controller 470 may also communicate with lifting mechanism 472 via data path 471. Although not explicitly shown, controller 470 may also provide commands to alter speed of one or more motors (e.g., motors 250) associated with shaker 400.

Still further, controller 470 may be communicatively coupled to more than a single shaker such that controller 470 would receive inputs from sets of sensors associated with individual shakers from a set of collectively functioning shakers. In turn, controller 470 may then analyze factors across the set of collectively functioning shakers and provide adjustments to effect changes in each individual shaker with an overall goal of improving a throughput of the collective set. This improvement over the collective set may cause some of the set to not be performing at their individual optimal levels but would provide for the overall drill mud recycling process to meet goals for a drilling operation.

The types of communication of data may be electrical in nature and may utilize some sort of communication protocol. The exact nature of the transfer of information is beyond the scope of this disclosure. However, any data communication technique including wired, or wireless may be utilized to implement the techniques of this disclosure.

Figure 5A:
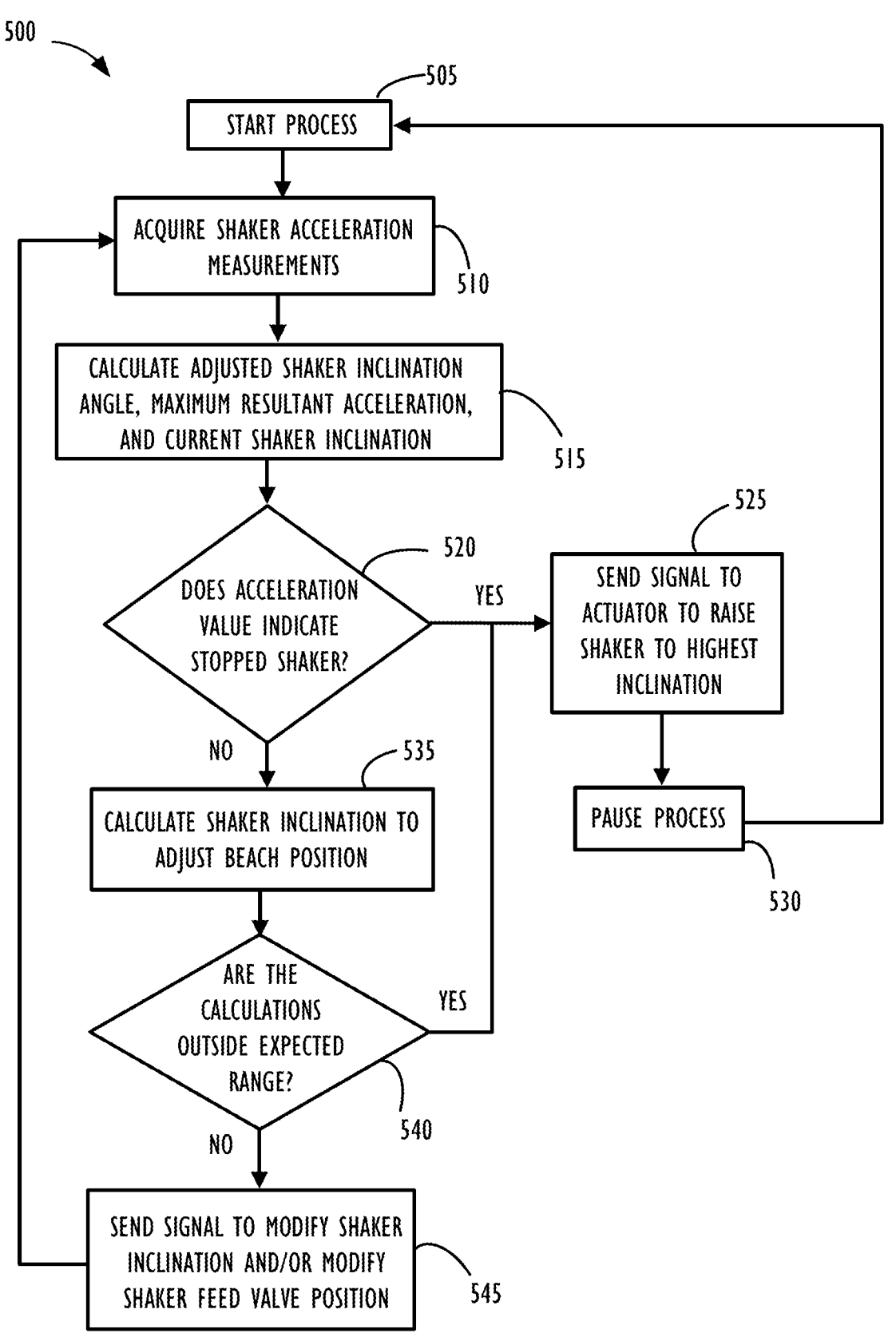
FIG. 5A is an example flow chart to use automatic control for fluid level using, for example, motion parameters for the shakers illustrated in FIG. 1B or 4 according to an embodiment of the present disclosure.

FIG. 5A is an example flow chart to use automatic control for fluid level using, for example, motion parameters for the shakers illustrated in FIG. 1B or 4 according to an embodiment of the present disclosure. The flow chart of FIG. 5A illustrates method 500 which shows an example of processing that might be performed by a controller. In this example, the controller would be implemented with computer instructions to react to sensors and then alter a shaker configuration as illustrated in FIG. 1B and explained for item 1 "Motion Parameters" as discussed above.

Method 500 begins at start process 505 and shaker acceleration parameters (measurements from sensors such as accelerometer 150) are acquired as shown at block 510. Block 515 illustrates that a shaker inclination angle (e.g., angle of attack), maximum resultant acceleration, and current shaker inclination may be calculated. Decision 520 indicates that the controller may determine if the calculations indicate a stopped shaker. If so, the YES prong of decision 520, flow continues to block 525 where a signal may be sent to an actuator (e.g., lifting mechanism) to raise the shaker to its highest inclination (e.g., to resume operation from the safest shaker inclination). Flow then continues to block 530 where a pause in the process may be provided for a pre-determined period of time (e.g., 60 seconds). After completing the pause, flow would then return to block 505 to re-acquire measurements and continue the process of method 500.

However, if decision 520 does not indicate a stopped shaker (the NO prong of decision 520), flow continues to block 535 where the controller may calculate an inclination (i.e., an alteration of the current inclination) to achieve an optimum beach position (e.g., a better operational location for the beach position). This calculation performed by the processor may be based upon, or at least leverage, an empirical model previously provided from testing for a similarly configured shaker.

Flow then continues to decision 540 where a determination is made as to if the calculations are outside of an expected pre-determined range of values. Specifically, are the measurements and calculations not within an expected range such that there may be an undetermined error condition or some other concern. If so, the YES prong of decision 540, flow proceeds to block 525 for what may be considered a shaker "reset" that is a similar function to what was discussed above for a "stopped" shaker.

If the calculations are within the expected range (e.g., all appears well with the calculations) flow continues to block 545 where a signal is sent to the actuator to modify the shaker inclination to what may be a more optimal position and adjust shaker feed valve position if necessary. Following this adjustment at block 545, flow returns to block 510 to repeat method 500. As can be seen from this flow diagram, method 500 is an iterative process that repeats to continually provide adjustments to a shaker in an effort to improve the performance of that shaker and maintain a beach at a desired (and hopefully optimal) location within the shaker.

Figure 5B:
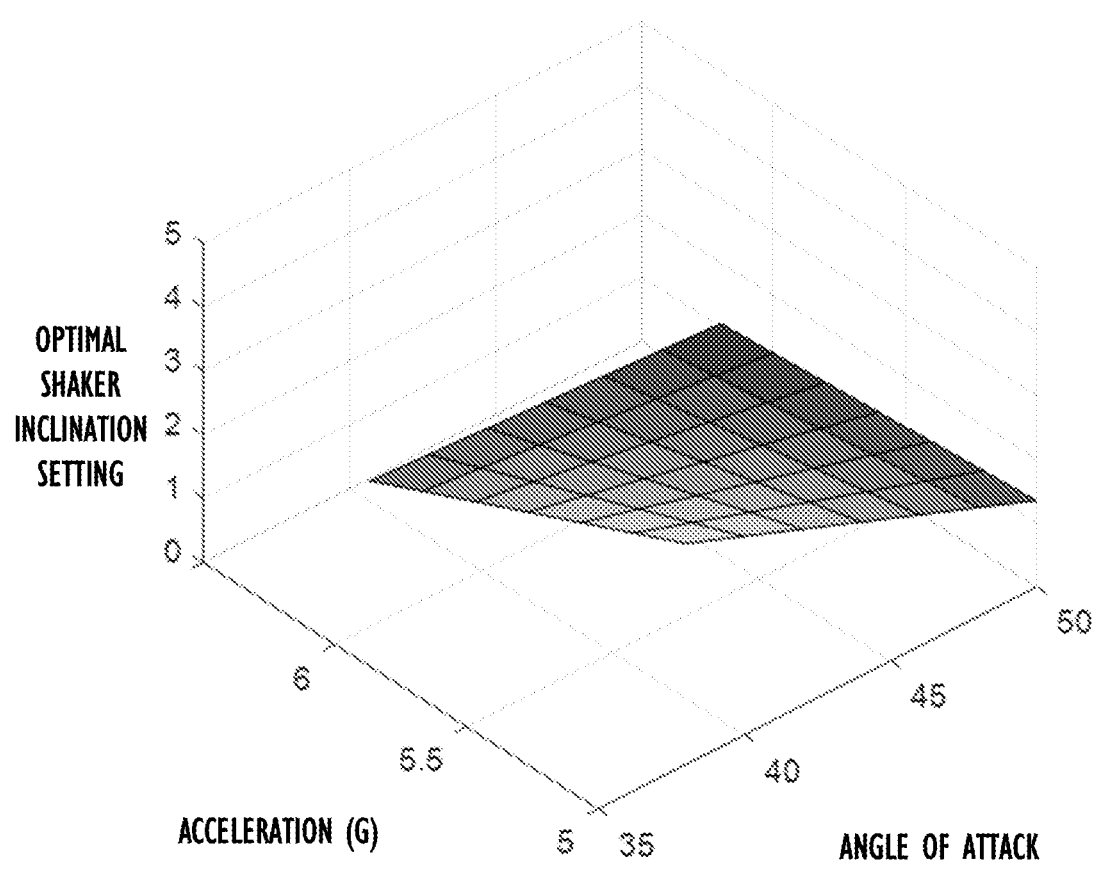
FIG. 5B is an example empirical model based on the embodiment associated with the flow chart of FIG. 5A according to an embodiment of the present disclosure.

FIG. 5B is an example empirical model based on the embodiment associated with the method 500 discussed above with reference to the flow chart of FIG. 5A in accordance with an embodiment of the present disclosure. This diagram relates shaker inclination angle to acceleration on one plane and on a third axis provides a shaker inclination setting. These measurements and associations were determined through testing of a shaker that would be similarly configured to the shaker for which this empirical model would be used in operation.

Referring now to FIGS. 6A-C, FIG. 6A is an example flow chart to use automatic control for fluid level using, for example, motor weight orientation (FIGS. 2A-B) for the shakers illustrated in FIG. 4 according to an embodiment of the present disclosure. The flow chart of FIG. 6A illustrates method 600 which shows an example of processing that might be performed by a controller. In this example, the controller would be implemented with computer instructions to react to sensors and then alter a shaker configuration as illustrated in FIGS. 2A-B and explained for item 2 "Motor Weight Orientation and Speed" as discussed above.

Method 600 begins at start process 605 and motor weight orientation, speed, and acceleration parameters (measurements from sensors such as accelerometer 210 and proximity sensors 205) are acquired as shown at block 610. Block 615 illustrates that a motor weight phase shift (e.g., amount of mis-alignment across a pair of motor weights), rotations per minute, current shaker inclination, and maximum acceleration (among other possible measurements) may be calculated. Decision 620 indicates that the controller may determine if the calculations indicate a stopped shaker. If so, the YES prong of decision 620, flow continues to block 625 where a signal may be sent to an actuator (e.g., lifting mechanism) to raise the shaker to its highest inclination (e.g., to resume operation from the safest shaker inclination). Flow then continues to block 630 where a pause in the process may be provided for a pre-determined period of time (e.g., 60 seconds). After completing the pause, flow would then return to block 605 to re-acquire measurements and continue the process of method 600.

However, if decision 620 does not indicate a stopped shaker (the NO prong of decision 620), flow continues to block 635 where the controller may calculate an inclination (i.e., an alteration of the current inclination) to achieve an optimum beach position (e.g., a better operational location for the beach position). This calculation performed by the processor may be based upon, or at least leverage, an empirical model previously provided from testing for a similarly configured shaker. These calculations may consider models based on phase shift, motor speed, and current shaker inclination as shown in FIGS. 6B and 6C.

Flow then continues to decision 640 where a determination is made as to if the calculations are outside of an expected pre-determined range of values. Specifically, are the measurements and calculations not within an expected range such that there may be an undetermined error condition or some other concern. If so, the YES prong of decision 640, flow proceeds to block 625 for what may be considered a shaker "reset" that is a similar function to what was discussed above for a "stopped" shaker.

If the calculations are within the expected range (e.g., all appears well with the calculations) flow continues to block 645 where a signal is sent to the actuator to modify the shaker inclination to what may be a more optimal position and adjust shaker feed valve position if necessary. Following this adjustment at block 645, flow returns to block 610 to repeat method 600. As can be seen from this flow diagram, method 600 is an iterative process that repeats to continually provide adjustments to a shaker in an effort to improve the performance of that shaker and maintain a beach at a desired (and hopefully optimal) location within the shaker.

FIGS. 6B and 6C are example empirical models based on the embodiment associated with the method 600 discussed above with reference to the flow chart of FIG. 6A in accordance with an embodiment of the present disclosure. FIG. 6B is an example of a first empirical model and FIG. 6B is a second empirical model. Each of these models are based on the embodiment associated with the flow chart of FIG. 6A in accordance with the present disclosure.

The diagram in FIG. 6B relates motor weight phase shift to acceleration on one plane and on a third axis provides a shaker inclination setting. These measurements and associations were determined through testing of a shaker that would be similarly configured to the shaker for which this empirical model would be used in operation.

The diagram in FIG. 6C relates motor speed to acceleration on one plane and on a third axis provides a shaker inclination setting. These measurements and associations were determined through testing of a shaker that would be similarly configured to the shaker for which this empirical model would be used in operation.

FIG. 7A is an example flow chart to use automatic control for fluid level using, for example, high frequency vibrations related to fluid levels for the shakers illustrated in FIGS. 3-4 according to an embodiment of the present disclosure. The flow chart of FIG. 7A illustrates method 700 which shows an example of processing that might be performed by a controller. In this example, the controller would be implemented with computer instructions to react to sensors and then alter a shaker configuration as illustrated in FIGS. 3-4 and explained for item 3 "High Frequency Vibration" as discussed above.

Method 700 begins at start process 705 and shaker screen support structure acceleration parameters (measurements from sensors such as accelerometer 350A, 350B, and 450B) are acquired as shown at block 710. Block 715 illustrates that filtering of these measurements, for example by a high pass filter, may be applied. After filtering, block 720 indicates that a calculation for RMS or other parameters (such as number of peaks in acceleration signal) of high frequency acceleration may be performed. Decision 725 indicates that the controller may determine if the calculations based on the RMS or other parameters indicate a stopped shaker or if the measurements are outside an expected (pre-determined) range. If so, the YES prong of decision 725, flow continues to block 730 where a signal may be sent to an actuator (e.g., lifting mechanism) to raise the shaker to its highest inclination (e.g., to resume operation from the safest shaker inclination). Flow then continues to block 735 where a pause in the process may be provided for a pre-determined period of time (e.g., 60 seconds). After completing the pause, flow would then return to block 705 to re-acquire measurements and continue the process of method 700.

However, if decision 725 does not indicate a stopped shaker (the NO prong of decision 725), flow continues to decision 740 where it may be determined if the calculated RMS value meets a pre-determined threshold value. If the RMS value meets the threshold value (the YES prong of decision 740), flow returns to block 710 to continue method 700.

Alternatively, if the threshold is not met (the NO prong of decision 740), flow continues to decision 745 where it is determined if the calculated value is above or below the pre-determined threshold value. If the calculated value is lower than the pre-determined threshold value (the YES prong of decision 745), flow continues to block 750 where a signal may be sent by the controller to the actuator to incrementally raise the shaker inclination (i.e., increase and uphill angle of the shaker) and adjust shaker feed valve position if necessary. After incremental adjustment, flow of method 700 would then continue to block 710 to repeat the method 700.

However, if it is determined at decision 745 that the calculated value is higher than the pre-determined threshold value (the NO prong of decision 745), flow proceeds to block 755 where a signal may be sent by the controller to the actuator to incrementally lower the shaker inclination (i.e., decrease and uphill angle of the shaker) and adjust shaker feed valve position if necessary. After incremental adjustment, flow of method 700 would then continue to block 710 to repeat the method 700.

As can be seen from this flow diagram, method 700 is an iterative process that repeats to continually provide adjustments to a shaker in an effort to improve the performance of that shaker and maintain a beach at a desired (and hopefully optimal) location within the shaker.

It has been observed that the spectrum of high frequency vibrations on a shaker screen structure may vary as a function related to flow levels for that shaker. This relation indicates that different flow levels through a shaker would result in different types of measurements that may be detected by sensors on a screen or screen support structure. By understanding the variations of these parameters, method 700 may be useful to determine a beach position and subsequently provide information by which to provide adjustments to a shaker in operation.

FIG. 7B is an example of target acceleration parameters, for the method regarding using high frequency vibrations related to flow levels (FIG. 7A), to achieve a desired "optimum" flow level according to an embodiment of the present disclosure. In graph 780 high frequency acceleration RMS(G) 794 represents the Y-axis. Increasing flow level 796 is shown along the X-axis. A target RMS is illustrated by dashed line 785. The RMS value of acceleration measured by an accelerometer is indicated by line 790 which varies based on flow level and acceleration.

Block 792 is a legend for the items of graph 780 and location 787 indicates where the intersection of the variable line 790 and target line 785 cross to provide an indication that optimum flow level 798 has been achieved.

Figure 8:
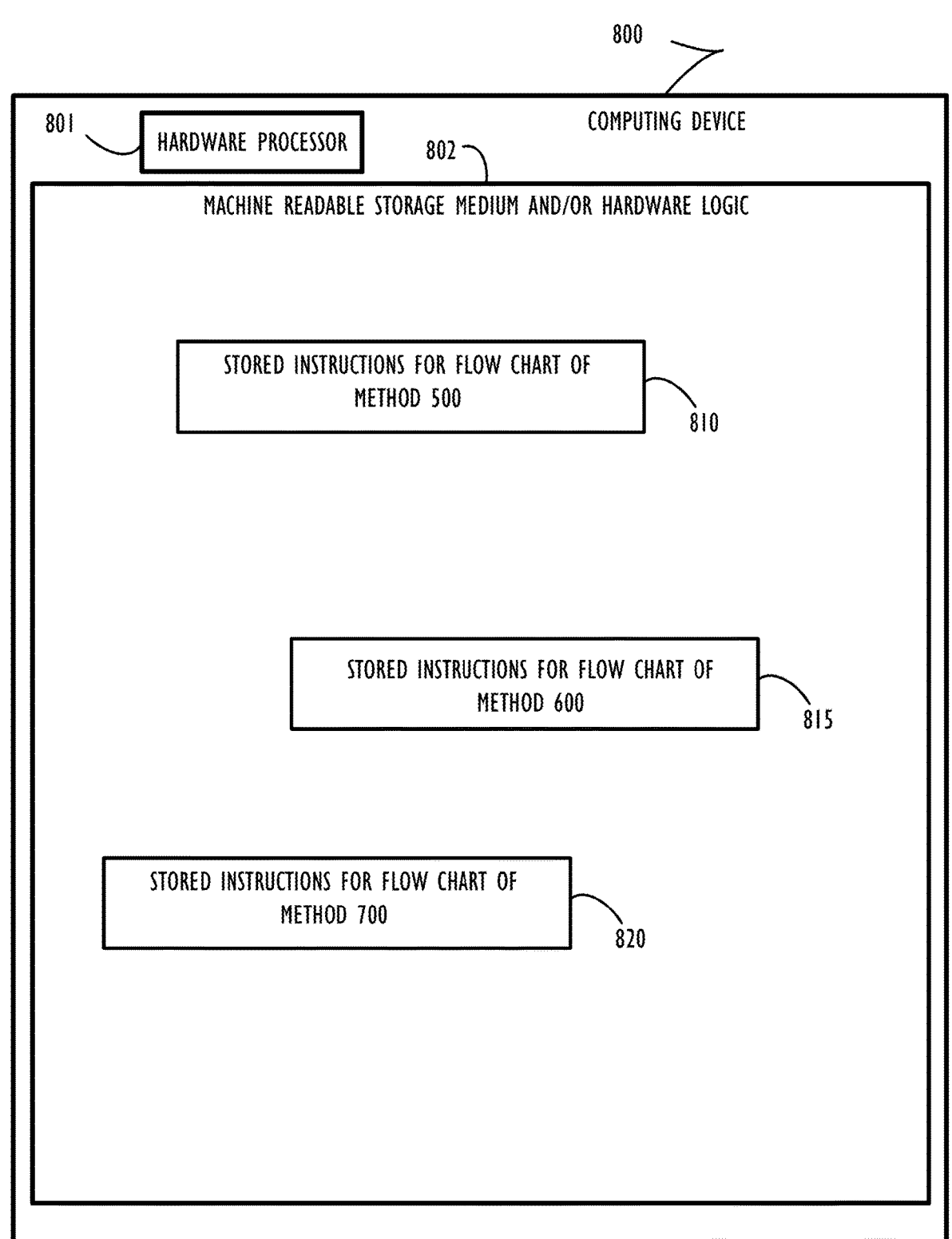
FIG. 8 is an example of a computing device, including a computer readable medium, that may be used to implement one or more of the workflows (in this case, for example, the workflows of FIGS. 5A, 6A, and 7A) according to one or more examples of this disclosure.

Referring now to FIG. 8, shown is an example computing device 800, with a hardware processor 801, and accessible machine-readable instructions stored on a machine-readable medium and/or hardware logic 802 that may be used to perform one or more functions of the shaker fluid level automatic control, according to one or more disclosed example implementations. In the illustrated embodiment, element 802 is a machine-readable medium. Specifically, FIG. 8 illustrates computing device 800 configured to perform the example workflow of methods 500 (block 810),

600 (block 815), or 700 (block 820) as an example. However, computing device 800 may also be configured to perform the flow of other methods, techniques, functions, or processes described in this disclosure. Specifically, computing device 800 may be configured to perform a combination of any of the above three methods (or other methods) concurrently.

In this example of FIG. 8, machine-readable storage medium 802 includes instructions to cause hardware processor 801 to perform blocks 810, 815, and/or 820 discussed above with reference to FIGS. 5A, 6A, and 7A. Different implementations of these methods are also possible, including hardware logic configured on a chip to implement all or part of any of these workflows in conjunction with an overall implementation of disclosed techniques to implement shaker fluid level automatic control.

A machine-readable storage medium, such as element 802 of FIG. 8, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory ("EPROM"), random access memory ("RAM"), non-volatile random access memory ("NVRAM"), optical disk, solid state drive ("SSD"), flash memory chips, and the like. The machine-readable storage medium may be a non-transitory storage medium, where the term "non-transitory" does not encompass transitory propagating signals.

Figure 9:
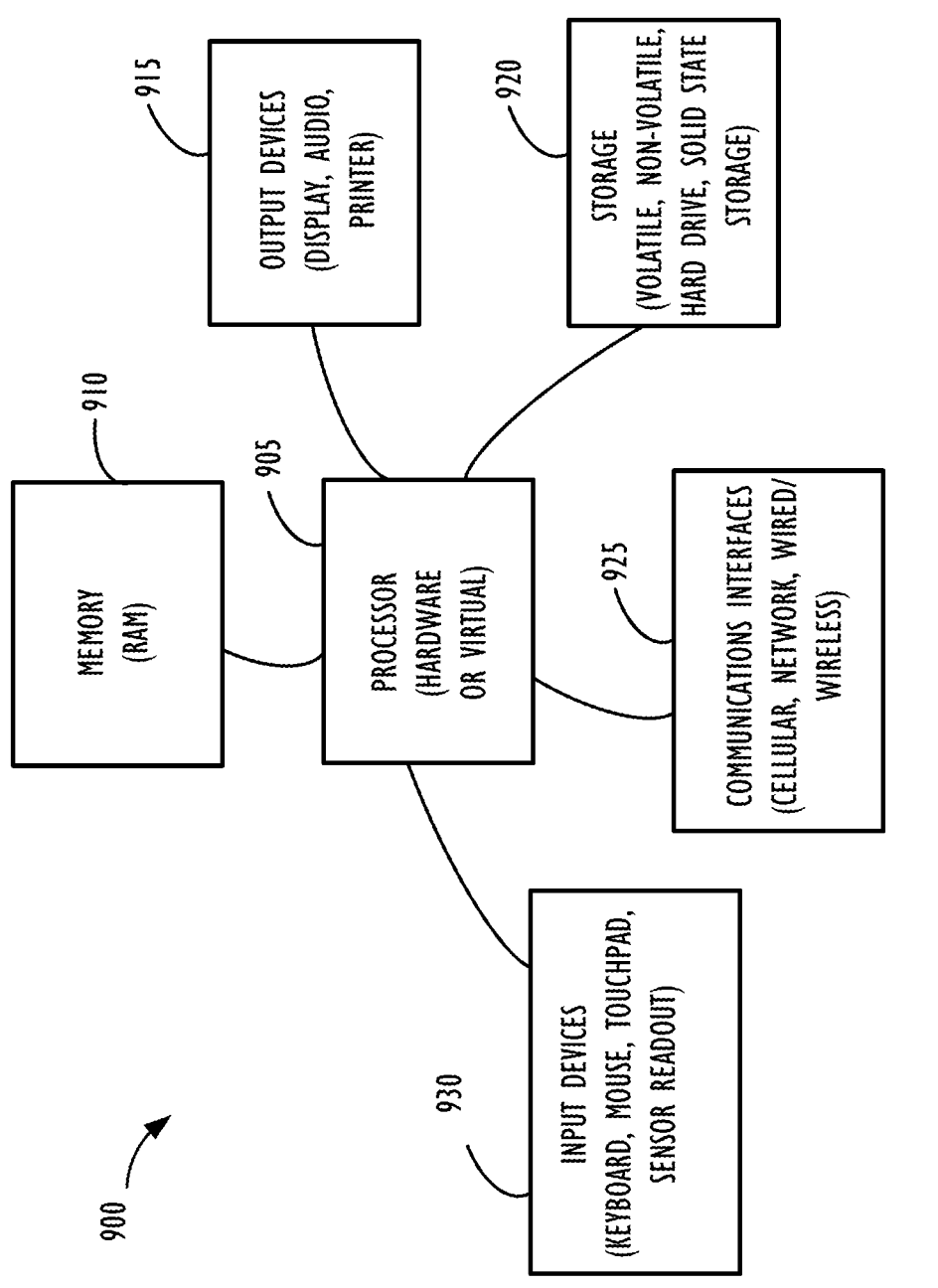
FIG. 9 is a block diagram providing an example of a computing device (e.g., a controller computer processor) that may be used within one or more of the devices shown in FIG. 1, 4, or 6 (or even other devices).

FIG. 9 illustrates a computing device 900 that may be used to implement or be used with the functions, modules, processing platforms, execution platforms, communication devices, and other methods and processes of this disclosure. Specifically, computing device 900 may be used to implement the above referenced shaker controller. Further, computing device 900 illustrated in FIG. 9 could represent a client device or a physical server device and include either hardware or virtual processor(s) depending on the level of abstraction of the computing device. In some instances (without abstraction), computing device 900 and its elements, as shown in FIG. 9, each relate to physical hardware. Alternatively, in some instances one, more, or all of the elements could be implemented using emulators or virtual machines as levels of abstraction. In any case, no matter how many levels of abstraction away from the physical hardware, computing device 900 at its lowest level may be implemented on physical hardware.

As also shown in FIG. 9, computing device 900 may include one or more input devices 930, such as a keyboard, mouse, touchpad, sensor input, or sensor readout (e.g., biometric scanner) and one or more output devices 915, such as displays, speakers for audio, or printers. Some devices may be configured as input/output devices also (e.g., a network interface or touchscreen display).

Computing device 900 may also include communications interfaces 925, such as a network communication unit that could include a wired communication component and/or a wireless communications component, which may be communicatively coupled to processor 905. The network communication unit may utilize any of a variety of proprietary or standardized network protocols, such as Ethernet®, TCP/IP, to name a few of many protocols, to effect communications between devices. Network communication units may also comprise one or more transceiver(s) that utilize the Ethernet®, power line communication ("PLC"), WiFi®, cellular, and/or other communication methods.

As illustrated in FIG. 9, computing device 900 includes a processing element such as processor 905 that contains one or more hardware processors, where each hardware processor may have a single or multiple processor cores. As mentioned above, each of the multiple processor cores may be paired with a task scheduler to facilitate implementations of this disclosure. In one embodiment, the processor 905 may include at least one shared cache that stores data (e.g., computing instructions) that are utilized by one or more other components of processor 905. For example, the shared cache may be a locally cached data stored in a memory for faster access by components of the processing elements that make up processor 905. In one or more embodiments, the shared cache may include one or more mid-level caches, such as level 2 ("L2"), level 3 ("L3"), level 4 ("L4"), or other levels of cache, a last level cache ("LLC"), or combinations thereof. Examples of processors include but are not limited to a central processing unit ("CPU") a microprocessor. Although not illustrated in FIG. 9, the processing elements that make up processor 905 may also include one or more of other types of hardware processing components, such as graphics processing units ("GPU"), application specific integrated circuits ("ASICs"), field-programmable gate arrays ("FPGAs"), and/or digital signal processors ("DSPs").

FIG. 9 illustrates that memory 910 may be operatively and communicatively coupled to processor 905. Memory 910 may be a non-transitory medium configured to store various types of data. For example, memory 910 may include one or more storage devices 920 that comprise a non-volatile storage device and/or volatile memory. Volatile memory, such as random-access memory ("RAM"), can be any suitable non-permanent storage device. The non-volatile storage devices 920 can include one or more disk drives, optical drives, solid-state drives ("SSDs"), tap drives, flash memory, read only memory ("ROM"), and/or any other type of memory designed to maintain data for a duration of time after a power loss or shut down operation. In certain instances, the non-volatile storage devices 920 may be used to store overflow data if allocated RAM is not large enough to hold all working data. The non-volatile storage devices 920 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 905. In one embodiment, the compiling process of the software program may transform program code written in a programming language to another computer language such that the processor 905 is able to execute the programming code. For example, the compiling process of the software program may generate an executable program that provides encoded instructions (e.g., machine code instructions) for processor 905 to accomplish specific, non-generic, particular computing functions.

After the compiling process, the encoded instructions may then be loaded as computer executable instructions or process steps to processor 905 from storage device 920, from memory 910, and/or embedded within processor 905 (e.g., via a cache or on-board ROM). Processor 905 may be configured to execute the stored instructions or process steps in order to perform instructions or process steps to transform the computing device into a non-generic, particular, specially programmed machine or apparatus. Stored data, e.g., data stored by a storage device 920, may be accessed by processor 905 during the execution of computer executable instructions or process steps to instruct one or more components within the computing device 900.

A user interface (e.g., output devices 915 and input devices 930) can include a display, positional input device (such as a mouse, touchpad, touchscreen, or the like), keyboard, or other forms of user input and output devices. The user interface components may be communicatively coupled to processor 905. When the output device is or includes a display, the display can be implemented in various ways, including by a liquid crystal display ("LCD") or a cathode-ray tube ("CRT") or light emitting diode ("LED") display, such as an organic light emitting diode ("OLED") display. Persons of ordinary skill in the art are aware that the computing device 900 may comprise other components well known in the art, such as sensors, powers sources, and/or analog-to-digital converters, not explicitly shown in FIG. 9.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The flowcharts and block diagram in the attached figures illustrate the architecture, functionality, and operation of possible implementations of systems, methods, and computer program products according to various embodiments of the present disclosure. In this regard, each block in the flowcharts or block diagram may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagram block or blocks.

This concludes the detailed description. The particular examples disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular examples disclosed above may be altered or modified and all such variations are considered within the scope and spirit of the invention. Accordingly, the protection sought herein is as set forth in the claims below.

What is claimed is:

1. A shaker used for separating used drilling mud at a well-site, the shaker comprising:
   a screen layer disposed within the basket to provide filtering, the screen layer defining an above screen layer to retain cuttings and other debris and a below screen layer for filtered mud fluid;
   one or more sensors to collect a set of run-time measurements for the shaker while the shaker is in operation, the run-time measurements including vibratory motor weight orientations, motor speed, and shaker acceleration; and
   a controller programmed with instructions representative of actions based on an empirical model derived previously from an operational shaker, the actions to provide run-time adjustments of the shaker to affect a beach position on the screen layer.

2. The shaker of claim 1, wherein the operational shaker used to derive the empirical model represents an equally operationally configured shaker.

3. The shaker of claim 1, wherein:
   the shaker furthermore includes at least two motors providing vibratory action to the basket, each of the at least two motors having a motor weight; and
   the set of run-time measurements reflect the motor speed for each of the at least two motors or at least one of a shaker vibration dominant frequency, a shaker current inclination, and a misalignment of motor weights.

4. The shaker of claim 3, wherein the one or more sensors is an accelerometer disposed upon the shaker.

5. The shaker of claim 1, wherein:
   the shaker furthermore includes at least two motors providing vibratory action to the basket, each of the at least two motors having a motor weight; and
   the one or more sensors include two proximity sensors, each of the two proximity sensors associated with a respective one motor from the at least two motors.

6. The shaker of claim 1, wherein the set of run-time measurements reflect using one or more accelerometers to determine a motion profile for the shaker and an inclination of the shaker.

7. The shaker of claim 1, wherein the set of run-time measurements reflect using one or more accelerometers associated with the screen layer to obtain high frequency vibrations associated with the screen layer that are indicative of the beach position.

8. The shaker of claim 1,
   further comprising a second shaker,
   wherein providing run-time adjustments from the programmed controller to adjust the beach position includes providing run-time adjustments to the lifting mechanism to increase or decrease an inclination of the second shaker.

9. The shaker of claim 1, wherein:
   the shaker further comprises a flow valve to control a feed rate of used drilling mud into the above screen layer of the basket of the shaker prior to separation; and
   providing run-time adjustments from the programmed controller to adjust the beach position includes providing run-time adjustments to the flow valve to increase or decrease a feed input flow of the shaker.

10. A shaker used for separating used drilling mud at a well-site, the shaker comprising:

a screen layer disposed within the basket to provide filtering, the screen layer defining an above screen layer to retain cuttings and other debris and a below screen layer for filtered mud fluid;
at least two motors providing vibratory action to the basket, each of the at least two motors having a motor weight;
one or more sensors to collect a set of run-time measurements for the shaker while the shaker is in operation, the set of run-time measurements reflecting a motor speed for each of the at least two motors or at least one of a shaker vibration dominant frequency, a shaker current inclination, and a misalignment of motor weights; and
a controller programmed with instructions representative of actions based on an empirical model derived previously from an operational shaker, the actions to provide run-time adjustments of the shaker to affect a beach position on the screen layer.

11. The shaker of claim 10, wherein the operational shaker used to derive the empirical model represents an equally operationally configured shaker.

12. The shaker of claim 10, wherein:
   the shaker furthermore includes at least two motors providing vibratory action to the basket, each of the at least two motors having a motor weight; and
   the one or more sensors include two proximity sensors, each of the two proximity sensors associated with a respective one motor from the at least two motors.

13. The shaker of claim 10, wherein the set of run-time measurements reflect using one or more accelerometers to determine a motion profile for the shaker and an inclination of the shaker.

14. The shaker of claim 10,
   further comprising a second shaker,
   wherein providing run-time adjustments from the programmed controller to adjust the beach position includes providing run-time adjustments to the lifting mechanism to increase or decrease an inclination of the second shaker.

15. The shaker of claim 10, wherein:
   the shaker further comprises a flow valve to control a feed rate of used drilling mud into the above screen layer of the basket of the shaker prior to separation; and
   providing run-time adjustments from the programmed controller to adjust the beach position includes providing run-time adjustments to the flow valve to increase or decrease a feed input flow of the shaker.

16. A shaker used for separating used drilling mud at a well-site, the shaker comprising:
   a screen layer disposed within the basket to provide filtering, the screen layer defining an above screen layer to retain cuttings and other debris and a below screen layer for filtered mud fluid;
   one or more sensors to collect a set of run-time measurements for the shaker while the shaker is in operation, the set of run-time measurements reflecting using one or more accelerometers associated with the screen layer to obtain high frequency vibrations associated with the screen layer that are indicative of the beach position; and
   a controller programmed with instructions representative of actions based on an empirical model derived previously from an operational shaker, the actions to provide run-time adjustments of the shaker to affect a beach position on the screen layer.

17. The shaker of claim 16, wherein the operational shaker used to derive the empirical model represents an equally operationally configured shaker.

18. The shaker of claim 16, wherein:

the shaker furthermore includes at least two motors providing vibratory action to the basket, each of the at least two motors having a motor weight; and the one or more sensors include two proximity sensors, each of the two proximity sensors associated with a respective one motor from the at least two motors.

19. The shaker of claim 16, wherein the set of run-time measurements reflect using one or more accelerometers to determine a motion profile for the shaker and an inclination of the shaker.

20. The shaker of claim 16, wherein:

the shaker further comprises a flow valve to control a feed rate of used drilling mud into the above screen layer of the basket of the shaker prior to separation; and providing run-time adjustments from the programmed controller to adjust the beach position includes providing run-time adjustments to the flow valve to increase or decrease a feed input flow of the shaker.

\* \* \* \* \*